(12) United States Patent
Tanaka

(10) Patent No.: US 7,705,287 B2
(45) Date of Patent: Apr. 27, 2010

(54) BROADBAND LIGHT SOURCE UNIT THAT PRODUCES A SUPERCONTINUUM LIGHTWAVE, AND OPTICAL ANALYZER

(75) Inventor: Masato Tanaka, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 12/247,409

(22) Filed: Oct. 8, 2008

(65) Prior Publication Data

US 2009/0095890 A1    Apr. 16, 2009

(30) Foreign Application Priority Data

Oct. 10, 2007    (JP)    ............... 2007-264805

(51) Int. Cl.
    *G01J 4/00*    (2006.01)
(52) U.S. Cl. .................. 250/227.18; 250/227.21
(58) Field of Classification Search ................
    250/227.18–227.23, 226, 216, 205, 214 R;
    385/2, 27, 39, 122; 372/20–32; 398/147,
    398/189–204, 330–332; 362/16, 510, 511
    See application file for complete search history.

(56) References Cited

U.S. PATENT DOCUMENTS 5,625,479 A * 4/1997 Suzuki et al. .............. 398/98

FOREIGN PATENT DOCUMENTS

| JP | 09-236834 | 9/1997 |
| JP | 2001-183531 | 7/2001 |
| JP | 2002-506226 | 2/2002 |
| JP | 2004-126398 | 4/2004 |
| JP | 2004-294543 | 10/2004 |
| WO | WO-99/45420 | 9/1999 |
| WO | WO-2007/083755 | 7/2007 |

OTHER PUBLICATIONS

Khan et al., "Short-term spectral stability of super-continuum source using noise-like pulses generated from an EDF laser", CLEO2005, Optical Society of America, CMV5, 3 pages (2005).

(Continued)

*Primary Examiner*—Que T Le
(74) *Attorney, Agent, or Firm*—Venable LLP; Michael A. Sartori; Steven J. Schwarz

(57) ABSTRACT

A broadband light source unit that produces a supercontinuum lightwave having a flat spectral form and has a light source that outputs a first source lightwave, which is a pulse lightwave having periodic pulses with a constant intensity, an intensity modulator that receives the first source lightwave, produces a second source lightwave having pulses whose intensities are different from one another, and outputs it, and a nonlinear optical medium section that receives the second source lightwave, produces a supercontinuum lightwave having a wavelength band broadened through a nonlinear optical phenomenon, and outputs it. An optical analyzer includes a light-applying section that applies a supercontinuum lightwave outputted from the broadband light source unit to a light-receiving region of a measurement-undergoing object, and an image pickup section that receives a lightwave generated at the light-receiving region by the application of the supercontinuum lightwave and picks up an image of the measurement-undergoing object.

8 Claims, 14 Drawing Sheets

OTHER PUBLICATIONS

Hori et al., "Experimental and numberical analysis of widely broadened supercontinuum generation in highly nonlinear dispersion-shifted fiber with a femtosecond pluse", J. Opt. Soc. Am. B, vol. 21, No. 11, pp. 1969-1980(2004).

Yasunaka et al., "87-nm bandwidth noise-like pulse generation from Erbium-doped fiber laser", Optical Society of America, CThGG6, 3 pages (2003).

* cited by examiner

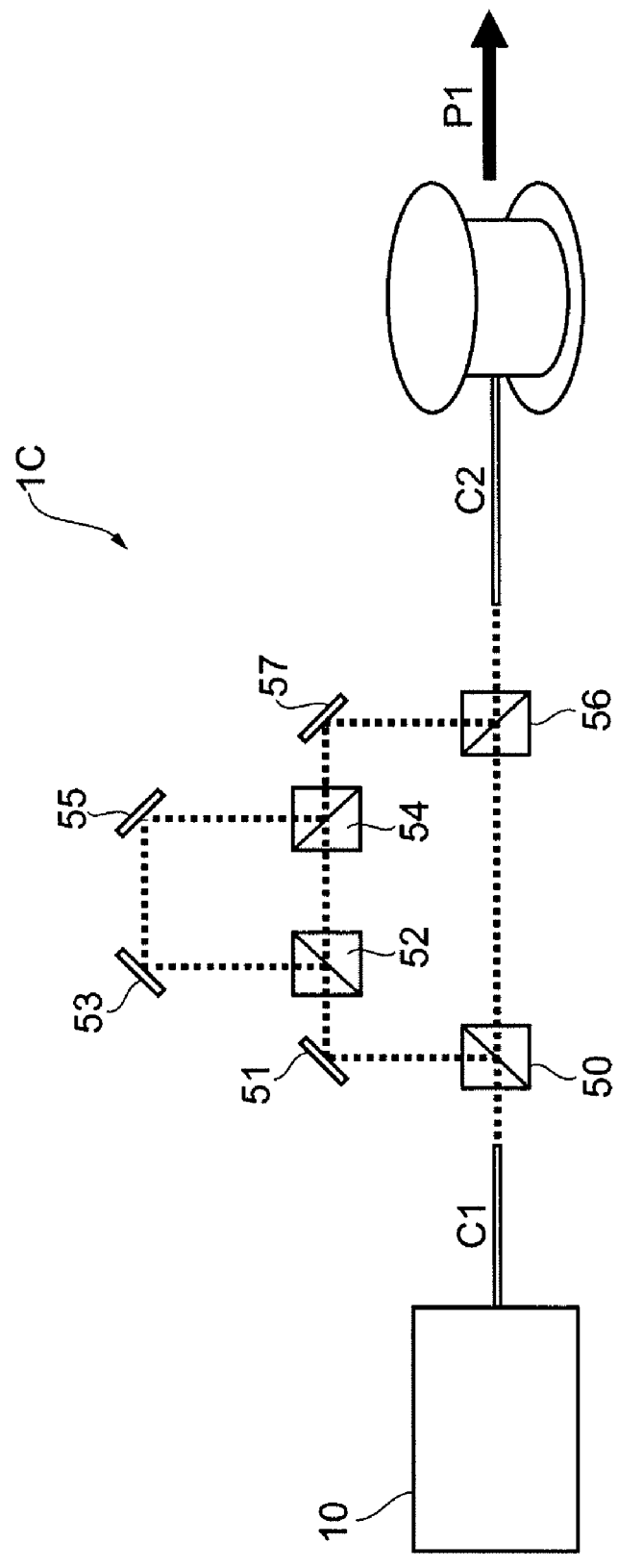

BROADBAND LIGHT SOURCE UNIT THAT PRODUCES A SUPERCONTINUUM LIGHTWAVE, AND OPTICAL ANALYZER

BACKGROUND OF THE INVENTION

1. Field of the Invention

The present invention relates to a broadband light source unit and an optical analyzer incorporating the unit.

2. Description of the Related Background Art

A supercontinuum lightwave (SC lightwave), which is a type of broadband lightwaves, can be obtained by passing a pulse lightwave having a narrow spectral width, or the like, through a nonlinear optical medium. The lightwave broadens its spectral width through undergoing dispersion and a nonlinear optical effect in the nonlinear optical medium. Usually, the spectral width of the SC lightwave is broadened to the extent of 10 to 100 times the spectral width of the inputted pulse lightwave. The SC lightwave combines the characteristics of a white lightwave and a laser lightwave and can be produced using a relatively simple method. Consequently, the SC lightwave attracts attention as a multiwavelength light source for optical communication and as an illuminating light source for an analyzer. However, the SC lightwave has a problem in that it sometimes cannot achieve a flat spectral form. For example, the spectrum, which is supposed to be flat, is sometimes split into a plurality of portions having different wavelengths.

In view of the above circumstances, M. S. Kahn et al. have disclosed a broadband light source unit intended to flatten the spectral form of the SC lightwave in a paper entitled "Short-term spectral stability of super-continuum source using noise-like pulses generated from an EDF laser," CLE02005, CMV5. In this light source unit, a lightwave outputted from a noise-like-mode fiber laser is introduced into a highly nonlinear fiber (HNLF). This method suppresses the spectral intensity deviation in a range of 1,200 to 1,700 nm in wavelength over the conventional SC lightwave produced by using a mode-locked actuating pulse. Nevertheless, the noise-like laser is not only limited in its applications but also disadvantageous both in cost and in reproducibility as a product.

SUMMARY OF THE INVENTION

An object of the present invention is to offer both a broadband light source unit that produces a supercontinuum lightwave having a flat spectral form by using a simple system and an optical analyzer incorporating the unit.

To attain the foregoing object, the present invention offers a broadband light source unit that is provided with a light source, a conversion means, and a nonlinear optical medium section. The light source outputs a first source lightwave, which is a pulse lightwave having pulses that are periodic and that have a constant intensity. The conversion means receives the first source lightwave, produces a second source lightwave having pulses whose intensities are different from one another, and outputs it. The nonlinear optical medium section receives the second source lightwave, produces a supercontinuum lightwave having a wavelength band broadened by dint of a nonlinear optical phenomenon, and outputs it. An embodiment of the conversion means is an intensity modulation means that receives the first source lightwave, modulates the intensity of the first source lightwave to generate the second source lightwave, and outputs it.

Another embodiment of the conversion means is provided with a branching means that branches the first source lightwave into N branched lightwaves (N means the number of branched lightwaves) such that the N branched lightwaves have intensities different from one another, a combining means that combines the N branched lightwaves and outputs a combined lightwave, and N optical paths (N means the number of optical paths) for guiding the N branched lightwaves from the branching means to the combining means, the N optical paths having optical path lengths different from one another. In this case, the following system may be employed: the branching means is a first optical coupler having N branches (N means the number of branches), the combining means is a second optical coupler having N input ends (N means the number of input ends), and the first optical coupler is optically coupled with the second optical coupler through N optical waveguides having lengths different from one another (N means the number of optical waveguides).

Yet another embodiment of the conversion means is provided with an optical coupler that has a first terminal, a second terminal, a third terminal, and a fourth terminal and an optical waveguide that optically couples between the second and fourth terminals of the optical coupler. The optical coupler receives the first source lightwave at the first terminal, branches the first source lightwave into a first branched lightwave and a second branched lightwave, outputs them from the second and third terminals, respectively, receives the first branched lightwave, outputted from the second terminal, at the fourth terminal, further branches the first branched lightwave into a third branched lightwave and a fourth branched lightwave, and outputs them from the second and third terminals, respectively. The second and fourth branched lightwaves outputted from the third terminal are collectively referred to as the second source lightwave.

A broadband light source unit of the present invention may further be provided with a pulse compression means that compresses the widths of the pulses of a lightwave outputted from the conversion means and outputs the width-compressed lightwave to the nonlinear optical medium section. A broadband light source unit of the present invention may further be provided with a polarization control means that controls a polarized state of a lightwave outputted from the conversion means and outputs the polarization-controlled lightwave to the nonlinear optical medium section.

The present invention also offers an optical analyzer that is provided with a broadband light source unit of the present invention, a light-applying section that applies a supercontinuum lightwave outputted from the broadband light source unit to a light-receiving region of a measurement-undergoing object, and an image pickup section that receives a lightwave generated at the light-receiving region by the application of the supercontinuum lightwave in the light-applying section and picks up an image of the measurement-undergoing object.

BRIEF DESCRIPTION OF THE DRAWING

FIG. 6 is a schematic diagram showing a third embodiment of the broadband light source unit of the present invention.

DETAILED DESCRIPTION OF THE INVENTION

Figure 1:
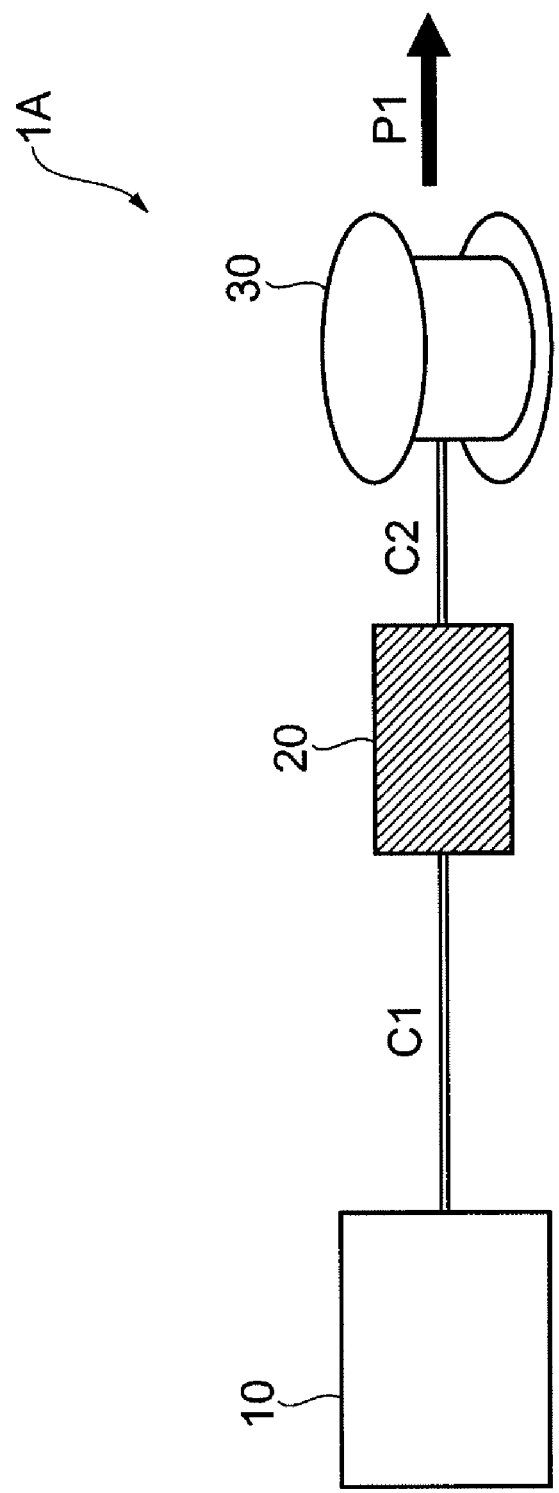
FIG. 1 is a schematic diagram showing a first embodiment of the broadband light source unit of the present invention.

Embodiments of the present invention are explained below by referring to the drawing. The drawing is intended to explain the present invention by showing an example, not to restrict the scope of the present invention. In the drawing, the same item is referred to by the same numeral or sign to eliminate duplicated explanations. The scale in the drawing is not to be considered precise.

First Embodiment

Figure 2A:
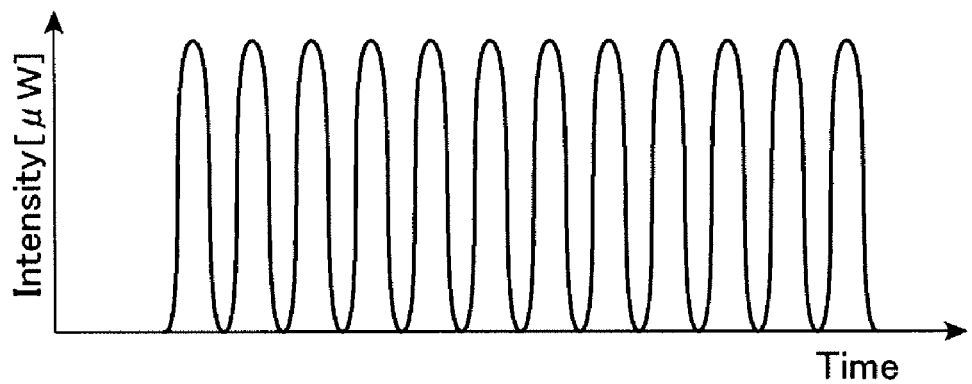
FIGS. 2A, 2B, and 2C are graphs respectively showing the pulse lightwave before the conversion, the voltage of the modulation signal, and the pulse lightwave after the conversion in the conversion means of the broadband light source unit in the first embodiment.
Figure 2B:
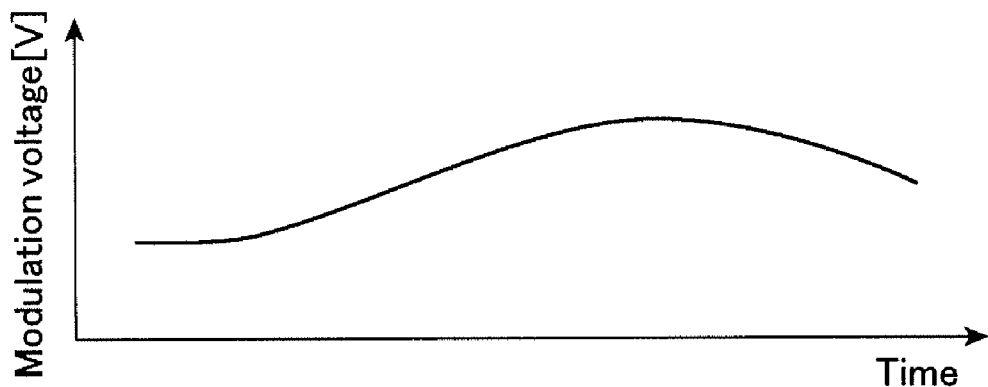
Figure 2C:
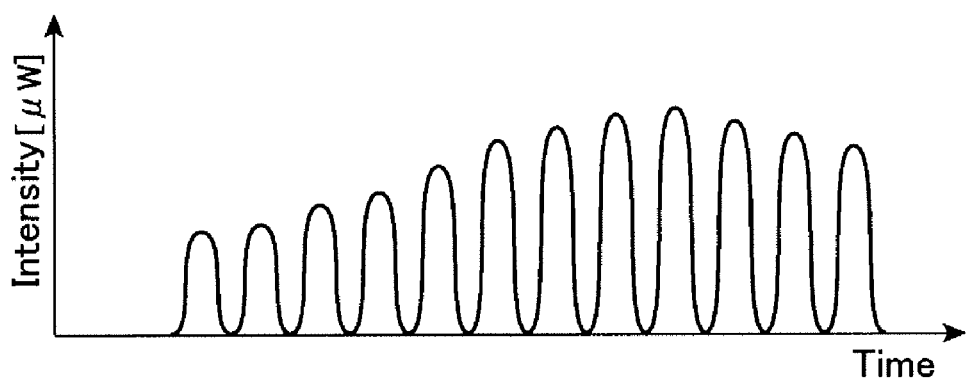

FIG. 1 is a schematic diagram showing a broadband light source unit 1A, which is a first embodiment of the present invention. The broadband light source unit 1A is provided with a light source 10, a conversion means (an intensity modulator 20), and an optical fiber 30. The light source 10 outputs a pulse lightwave C1 (a first source lightwave) as a source lightwave.

the intensity modulator 20 is, for example, a gain-variable amplifier or an attenuation-variable attenuator. FIGS. 2A, 2B, and 2C are graphs respectively showing the pulse lightwave C1 before the conversion, the voltage of the modulation signal, and a pulse lightwave C2 after the conversion in the intensity modulator 20 of the broadband light source unit 1A. The modulation signal has a frequency that deviates from an integral multiple and an integral submultiple both of the pulse repetition frequency. The pulse lightwave C1 has pulses that are periodic and that have a constant intensity. The individual pulses are subjected to different amounts of amplification or attenuation. As a result, the pulse lightwave C1 is converted into a pulse lightwave C2 (a second source lightwave), which has pulses whose spacings are the same but whose intensities are different from one another.

The optical fiber 30 forms a nonlinear optical medium section. It is desirable that the optical fiber 30 be a highly nonlinear fiber (HNLF). When the pulse lightwave C2 is introduced into the optical fiber 30, the optical fiber 30 generates, by dint of a nonlinear optical phenomenon, a plurality of supercontinuum lightwaves (SC lightwaves), in which the wavelength bands of the individual pulses that constitute the pulse lightwave C2 and that have intensities different from one another are broadened. Then, the optical fiber 30 outputs the multiple SC lightwaves.

Figure 3:
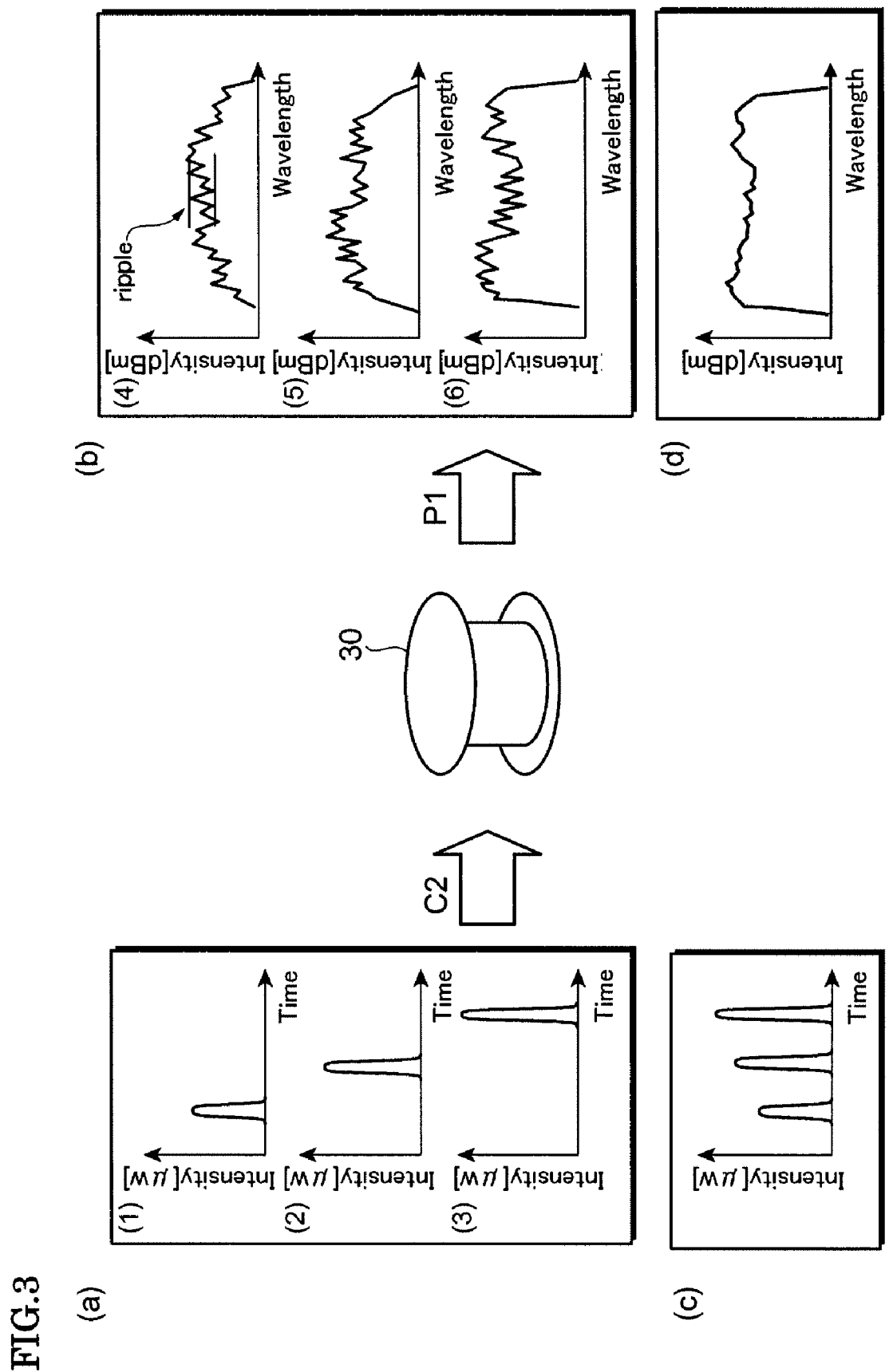
FIG. 3 is a schematic diagram explaining an example of the operation of the broadband light source unit in the first embodiment.

FIG. 3 is a schematic diagram explaining an example of the operation of the broadband light source unit 1A. The upper half of FIG. 3 shows that when the pulses (graphs (1), (2), and (3)) constituting the pulse lightwave C2 enter the optical fiber 30, the optical fiber 30 generates, for the individual pulses, SC lightwaves (graphs (4), (5), and (6)) having spectra different from one another.

When the pulse repetition period of the pulse lightwave C2 is sufficiently short (region (c) in FIG. 3), the multiple SC lightwaves are integrated in terms of time. As a result, the ripples of the spectra (the local fluctuations or intensity variations in the spectra) of the multiple SC lightwaves are mutually canceled. Thus, an SC lightwave P1 (region (d) in FIG. 3) can be obtained that has a spectrum in which the ripples are mutually canceled.

Second Embodiment

Figure 4:
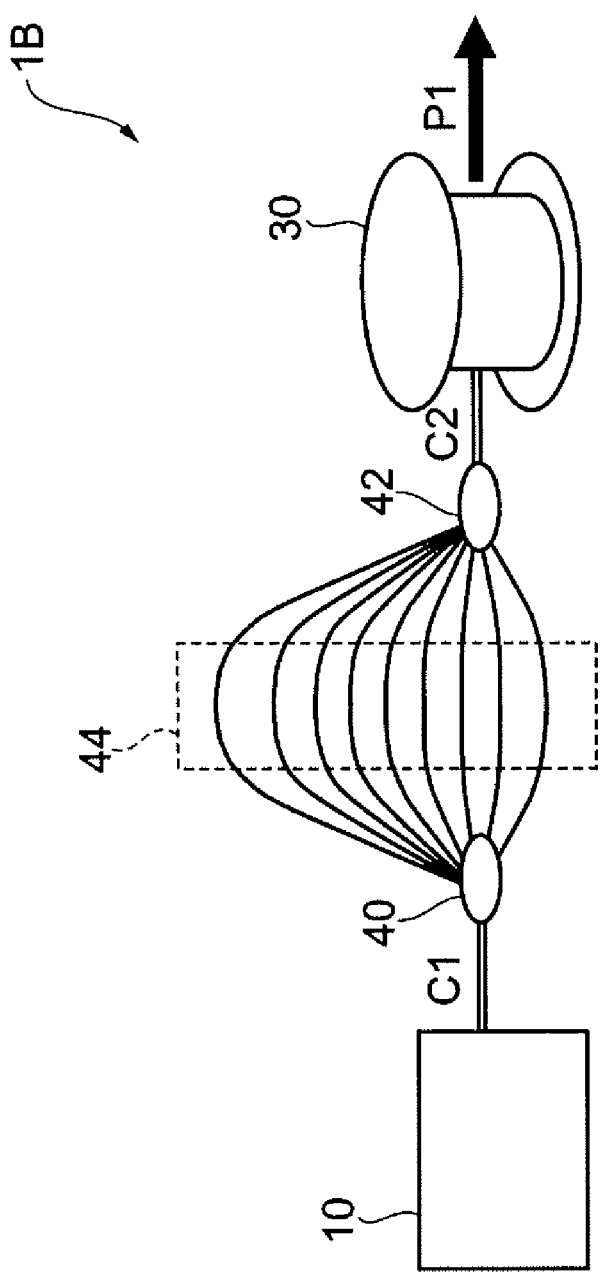
FIG. 4 is a schematic diagram showing a second embodiment of the broadband light source unit of the present invention.

FIG. 4 is a schematic diagram showing a broadband light source unit 1B, which is a second embodiment of the present invention. The broadband light source unit 1B is provided with a light source 10, a conversion means, and an optical fiber 30. The conversion means is composed of a first optical coupler 40, a second optical coupler 42, and N optical fibers 44 having lengths different from one another (N means the number of optical fibers).

The first optical coupler 40 branches a pulse lightwave C1 outputted from the light source 10 into N branched lightwaves such that the N branched lightwaves have intensities different from one another (N means the number of branched lightwaves). The N branched lightwaves are introduced into the N optical fibers 44 individually. The N optical fibers 44 are optical waveguides that have lengths different from one another and that optically couple the first optical coupler 40 with the second optical coupler 42. The N optical fibers 44 receive the N branched lightwaves outputted from the first optical coupler 40, guide them through optical paths different in optical path length from one another, and output them to the second optical coupler 42. The second optical coupler 42 has N input ends (N means the number of input ends), receives the N branched lightwaves outputted from the N optical fibers 44, and combines them. The combined lightwave is outputted as a pulse lightwave C2 from the second optical coupler 42.

Figure 5A:
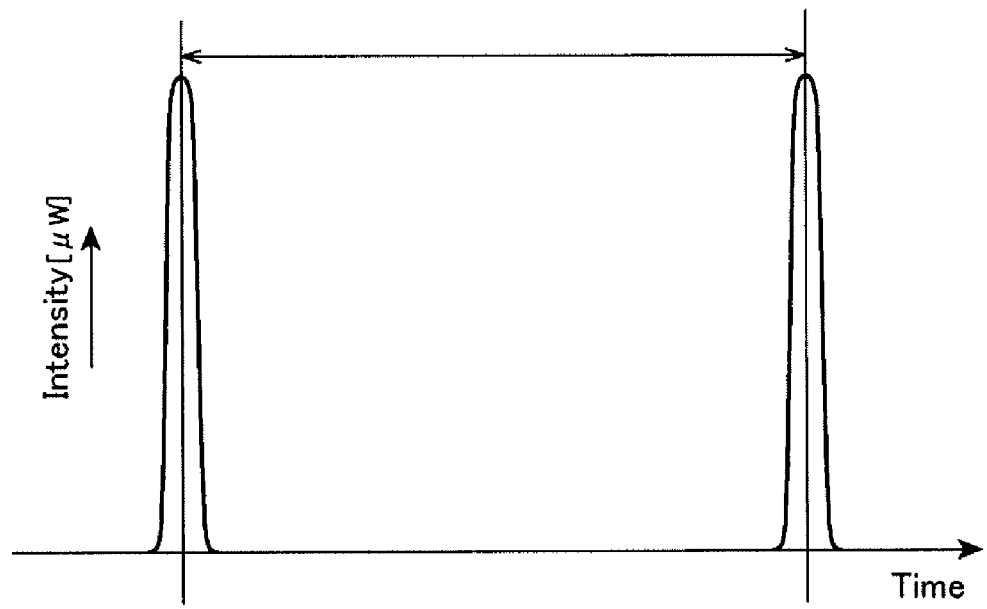
FIGS. 5A and 5B are graphs respectively showing the pulse lightwave before the conversion and the pulse lightwave after the conversion in the conversion means of the broadband light source unit in the second embodiment.
Figure 5B:
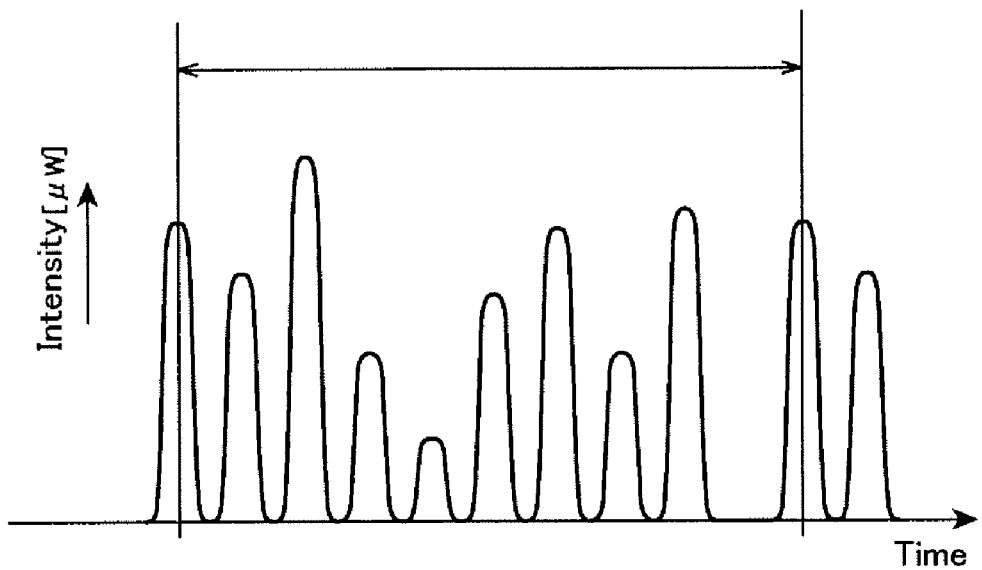

FIGS. 5A and 5B are graphs respectively showing the pulse lightwave C1 before the conversion and the pulse lightwave C2 after the con version in the conversion means of the broadband light source unit 1B. Whereas the pulse lightwave C1 has pulses that have a constant spacing and the same intensity, the pulse lightwave C2 has pulses that have narrower spacings and intensities different from one another.

The pulse lightwave C2 is inputted into the optical fiber 30 to be guided by it. In the optical fiber 30, the wavelength bands of the individual pulses that constitute the pulse lightwave C2 and that have intensities different from one another are broadened by dint of a nonlinear optical phenomenon accompanying the guiding of the lightwave. Thus, the individual pulses become SC lightwaves having spectra different from one another. Then, the individual SC lightwaves are outputted from the optical fiber 30. When the pulse repetition period of the pulse lightwave C2 is sufficiently short, the multiple SC lightwaves are integrated in terms of time. As a result, the ripples of the spectra of the multiple SC lightwaves are mutually canceled. Thus, an SC lightwave P1 can be obtained that has a spectrum in which the ripples are mutually canceled.

Third Embodiment

FIG. 6 is a schematic diagram showing a broadband light source unit 1C, which is a third embodiment of the present invention. The broadband light source unit 1C is provided with a light source 10, a conversion means, and an optical fiber 30. The conversion means is composed of beam splitters 50, 52, 54, and 56 and mirrors 51, 53, 55, and 57. In the third embodiment, with respect to all the mirrors and beam splitters, the lightwave enters them at an entry angle of 45 degrees and is reflected from them at an angle of reflection of 45 degrees.

The beam splitter 50 transmits part of a pulse lightwave C1 outputted from the light source 10 to send it to the beam splitter 56 and reflects the remainder to send it to the mirror 51. The mirror 51 receives the branched lightwave reflected from the beam splitter 50 and reflects it to send it to the beam splitter 52. The beam splitter 52 receives the branched lightwave reflected from the mirror 51, transmits part of the branched lightwave to send it to the beam splitter 54, and reflects the remainder to send it to the mirror 53.

The mirror 53 receives the lightwave reflected from the beam splitter 52 and reflects it to send it to the mirror 55. The mirror 55 receives the lightwave reflected from the mirror 53 and reflects it to send it to the beam splitter 54. The beam splitter 54 receives the lightwave reflected from the mirror 55, receives the lightwave transmitted through the beam splitter 52, combines the two lightwaves, and outputs the combined lightwave. The mirror 57 receives the combined lightwave outputted from the beam splitter 54 and reflects it to send it to the beam splitter 56. The beam splitter 56 receives the lightwave reflected from the mirror 57, receives the lightwave transmitted through the beam splitter 50, combines the two lightwaves, and outputs the combined lightwave.

Figure 7A:
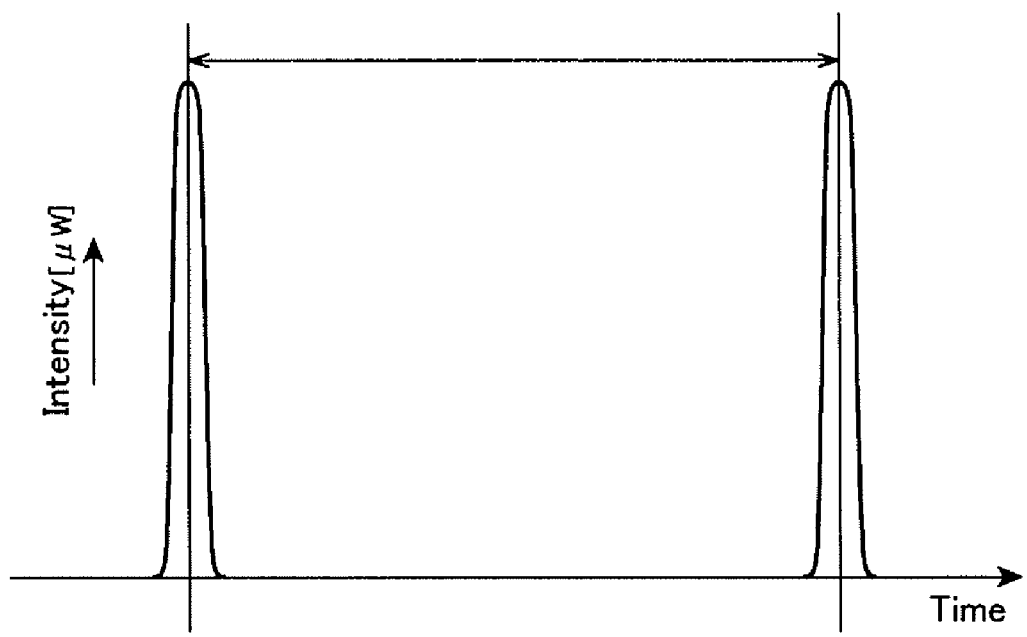
FIGS. 7A and 7B are graphs respectively showing the pulse lightwave before the conversion and the pulse lightwave after the conversion in the conversion means of the broadband light source unit in the third embodiment.
Figure 7B:
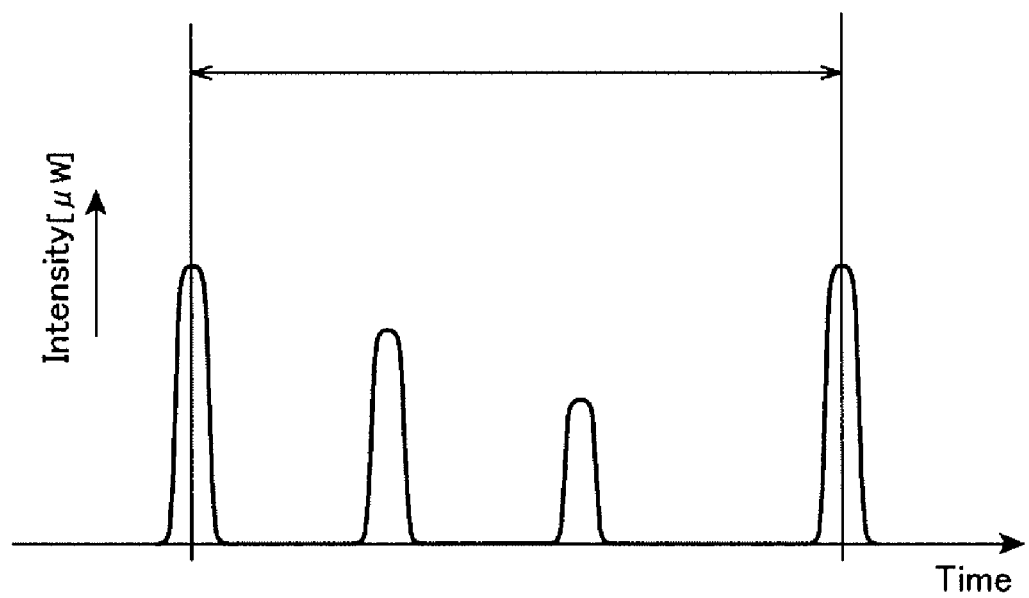

FIGS. 7A and 7B are graphs respectively showing the pulse lightwave C1 before the conversion and the pulse lightwave C2 after the conversion in the conversion means of the broadband light source unit 1C. Whereas the pulse lightwave C1 has pulses that have a constant spacing and the same intensity, the pulse lightwave C2 has pulses that have narrower spacings and intensities different from one another.

The pulse lightwave C2 is inputted into the optical fiber 30 to be guided by it. In the optical fiber 30, the wavelength bands of the individual pulses that constitute the pulse lightwave C2 and that have intensities different from one another are broadened by dint of a nonlinear optical phenomenon accompanying the guiding of the lightwave. Thus, the individual pulses become SC lightwaves having spectra different from one another. Then, the individual SC lightwaves are outputted from the optical fiber 30. When the pulse repetition period of the pulse lightwave C2 is sufficiently short, the multiple SC lightwaves are integrated in terms of time. As a result, the ripples of the spectra of the multiple SC lightwaves are mutually canceled. Thus, an SC lightwave P1 can be obtained that has a spectrum in which the ripples are mutually canceled.

Fourth Embodiment

Figure 8:
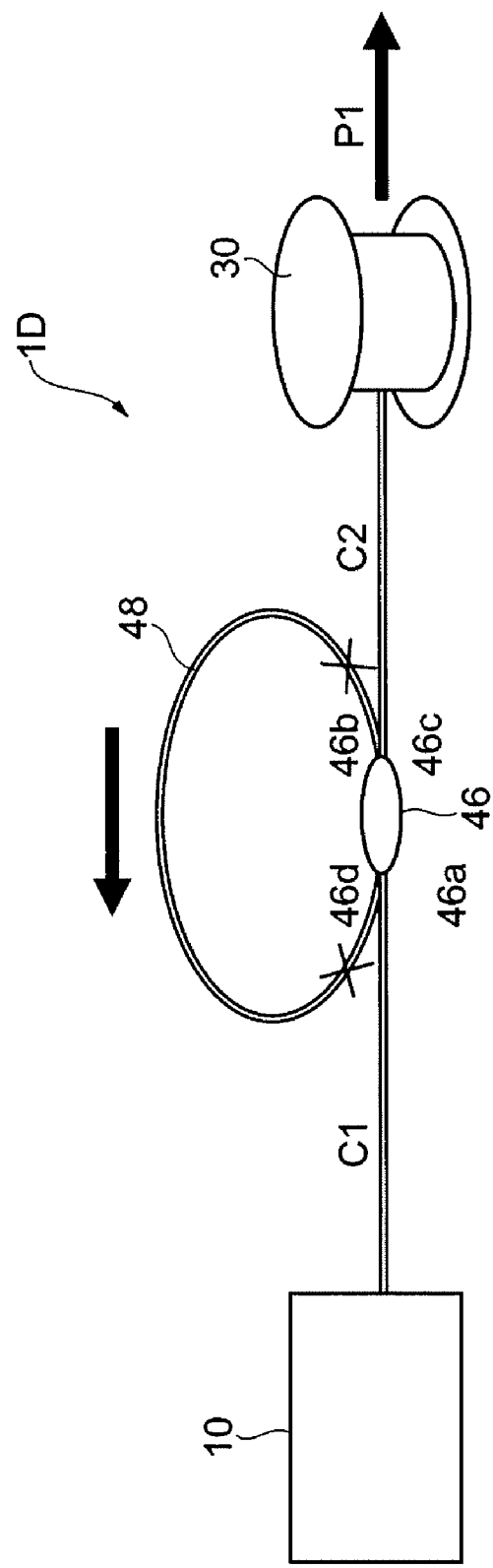
FIG. 8 is a schematic diagram showing a fourth embodiment of the broadband light source unit of the present invention.

FIG. 8 is a schematic diagram showing a broadband light source unit 1D, which is a fourth embodiment of the present invention. The broadband light source unit 1D is provided with a light source 10, a conversion means, and an optical fiber 30. The conversion means is composed of an optical coupler 46 having a first terminal 46a, a second terminal 46b, a third terminal 46c, and a fourth terminal 46d and an optical fiber 48.

The optical coupler 46 receives a pulse lightwave C1 outputted from the light source 10 at the first terminal 46a, which is the lightwave-receiving end, branches the pulse lightwave C1 into a first branched lightwave T1 and a second branched lightwave T2, and outputs them from the second terminal 46b and the third terminal 46c, respectively. As shown in FIG. 8, the optical fiber 48 is an optical waveguide whose two ends are optically coupled to the second terminal 46b and the fourth terminal 46d of the optical coupler 46, respectively, using the fusion-splicing method or the like. The optical fiber 48 guides the first branched lightwave T1 outputted from the second terminal 46b of the optical coupler 46 and inputs it to the fourth terminal 46d.

The optical coupler 46 receives the first branched lightwave T1 at the fourth terminal 46d, further branches it into a third branched lightwave T3 and a fourth branched lightwave T4, and outputs them from the second terminal 46b and the third terminal 46c, respectively. The second branched lightwave T2 and the fourth branched lightwave T4 both outputted from the third terminal 46c are combined. In other words, the combined lightwave becomes a pulse lightwave C2 (a second source lightwave) and is outputted from the third terminal 46c of the optical coupler 46.

Figure 9A:
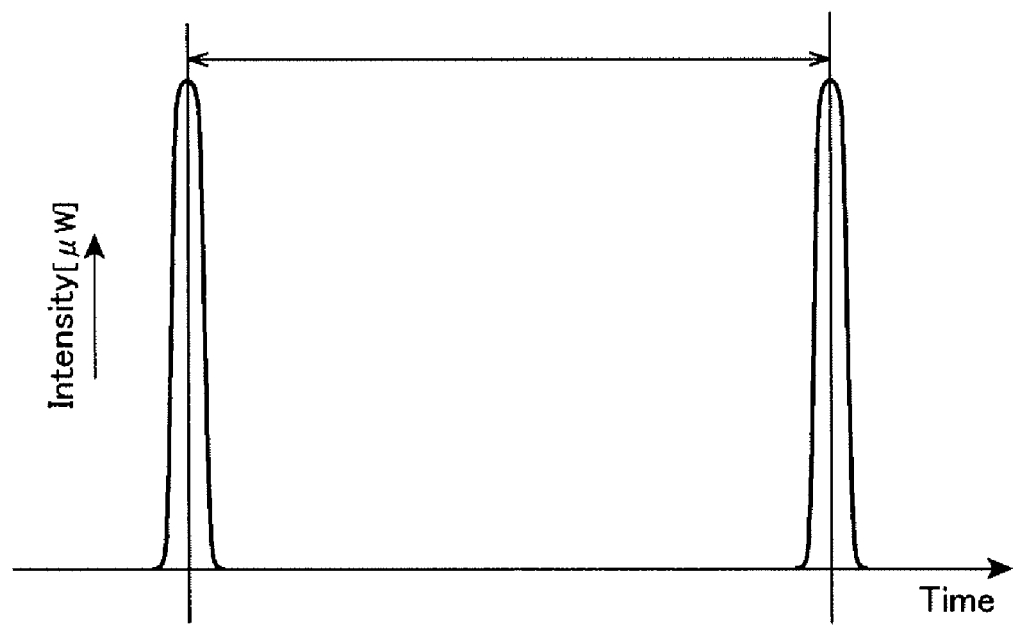
FIGS. 9A and 9B are graphs respectively showing the pulse lightwave before the conversion and the pulse lightwave after the conversion in the conversion means of the broadband light source unit in the fourth embodiment.
Figure 9B:
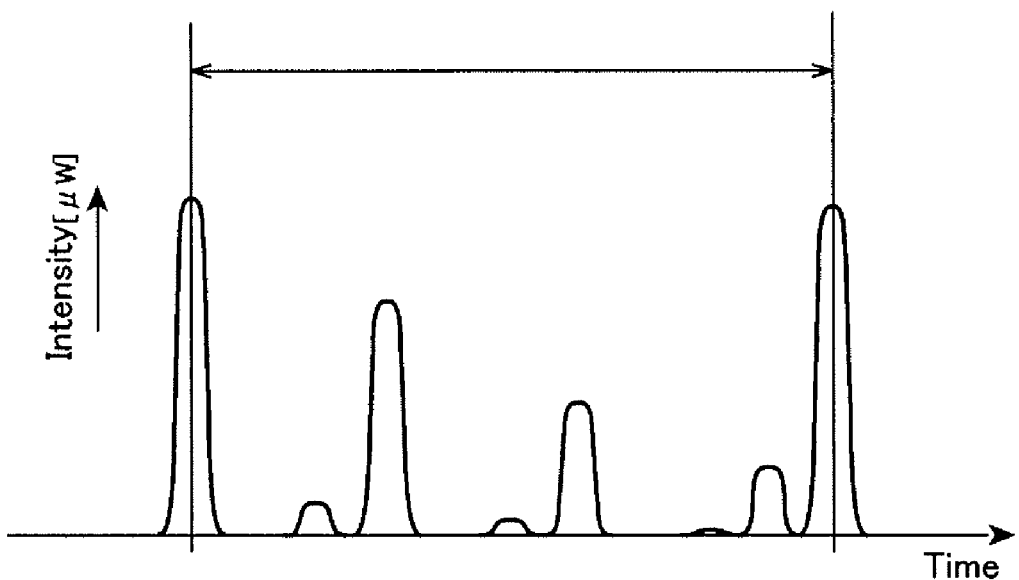

FIGS. 9A and 9B are graphs respectively showing the pulse lightwave C1 before the conversion and the pulse lightwave C2 after the conversion in the conversion means of the broadband light source unit 1D. Whereas the pulse lightwave C1 has pulses that have a constant spacing and the same intensity, the pulse lightwave C2 has pulses that have narrower spacings and intensities different from one another. More specifically, in the case where the optical coupler 46 is a 3-dB coupler, every time the third branched lightwave makes a round of a loop-shaped waveguide formed of the second terminal 46b, the fourth terminal 46d, and the optical fiber 48, the fourth branched lightwave is outputted from the third terminal 46c with an intensity lower than that of the third branched lightwave by 3 dB (for example, 9 dB when three rounds are made). As a result, as shown in FIG. 9B, the pulse lightwave C2, composed of the second and fourth branched lightwaves, decreases its intensity.

The pulse lightwave C2 is inputted into the optical fiber 30 to be guided by it. In the optical fiber 30, the wavelength bands of the individual pulses that constitute the pulse lightwave C2 and that have intensities different from one another are broadened by dint of a nonlinear optical phenomenon accompanying the guiding of the lightwave. Thus, the individual pulses become SC lightwaves having spectra different from one another. Then, the individual SC lightwaves are outputted from the optical fiber 30. When the pulse repetition period of the pulse lightwave C2 is sufficiently short, the multiple SC lightwaves are integrated in terms of time. As a result, the ripples of the spectra of the multiple SC lightwaves are mutually canceled. Thus, an SC lightwave P1 can be obtained that has a spectrum in which the ripples are mutually canceled.

As explained above, the broadband light source units 1A to 1D can produce the SC lightwave P1 having a flat spectral form, even when the spectra of the individual SC lightwaves produced from the individual pulses constituting the pulse lightwave C2 are split into multiple portions having different wavelengths at the time the pulse lightwave C2 grows in the optical fiber 30 under the influence of the dispersion and a nonlinear optical phenomenon. In addition, the foregoing units can produce an SC lightwave having a flat spectral form by using a simple system.

Fifth Embodiment

Figure 10:
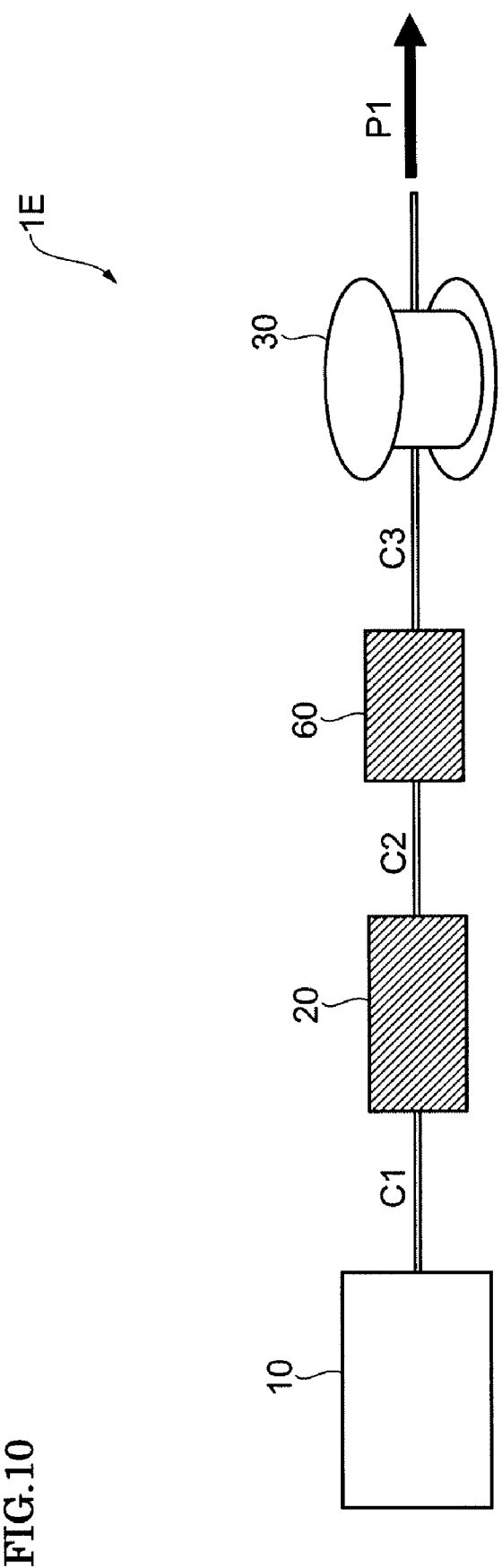
FIG. 10 is a schematic diagram showing a fifth embodiment of the broadband light source unit of the present invention.

FIG. 10 is a schematic diagram showing a broadband light source unit 1E, which is a fifth embodiment of the present invention. In comparison with the broadband light source unit 1A in the first embodiment, the broadband light source unit 1E is further provided with a pulse compression section 60 between the intensity modulator 20 and the optical fiber 30. The pulse compression section 60 compensates, by using the dispersion compensation or a nonlinear optical effect, the spreading of the pulse width of the pulse lightwave C2 outputted from the intensity modulator 20 after its intensity is modulated.

Figure 11A:
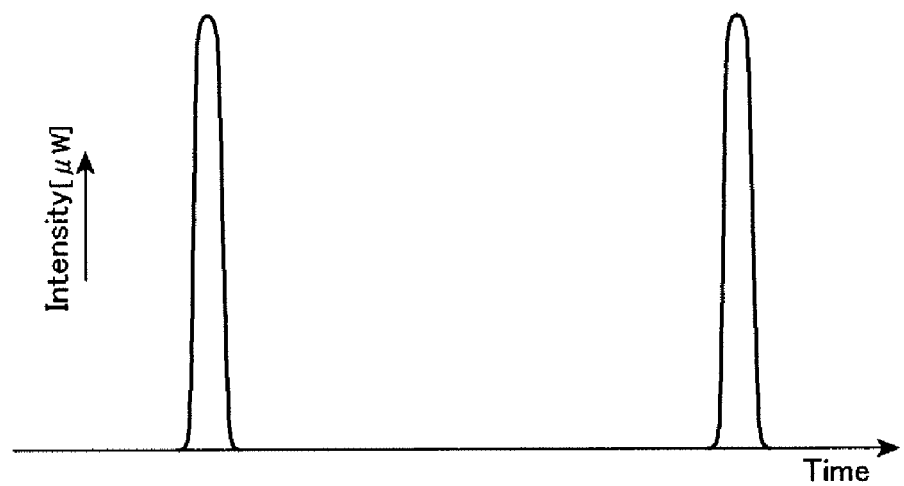
FIGS. 11A, 11B, and 11C are graphs respectively showing the pulse lightwave before entering the conversion means, the pulse lightwave after the intensity modulation, and the pulse lightwave after the pulse compression in the broadband light source unit in the fifth embodiment.
Figure 11B:
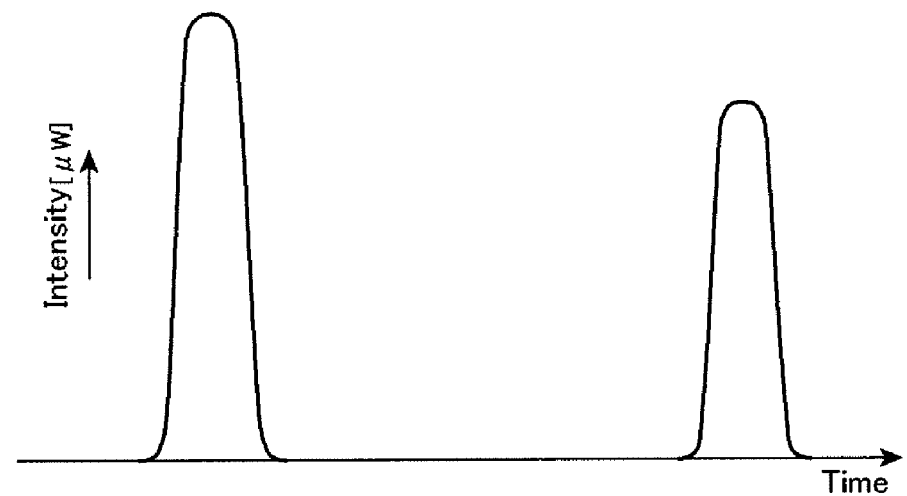

In the broadband light source unit 1E, a pulse lightwave C1 outputted from the light source 10 enters the intensity modulator 20. The intensity modulator 20 generates a pulse lightwave C2 having pulses whose intensities are different from one another and outputs the pulse lightwave C2. FIGS. 11A and 11B are graphs respectively showing the pulse lightwave C1 before entering the conversion means and the pulse lightwave C2 after the intensity modulation in the broadband light source unit in the fifth embodiment. In contrast to the pulse lightwave C1, the pulse lightwave C2 has pulses whose intensities are different from one another although whose spacings are the same.

Figure 11C:
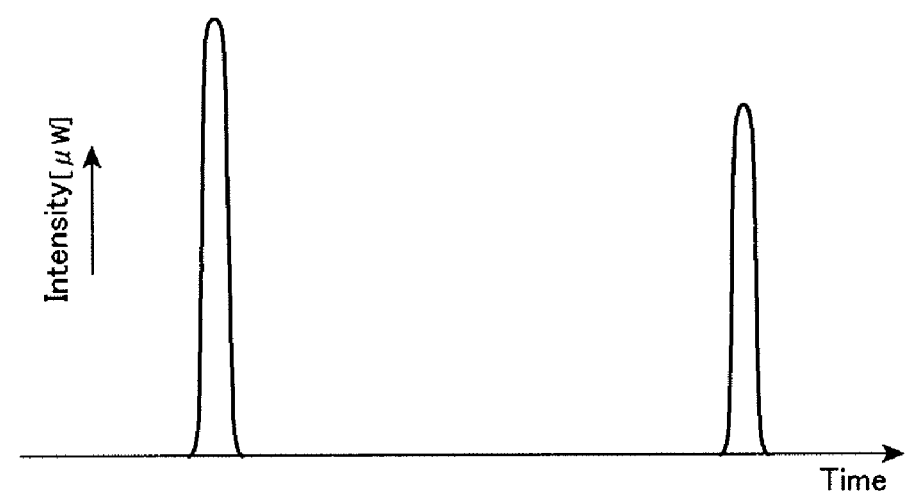

The pulse lightwave C2 enters the pulse compression section 60. The pulse compression section 60 compensates the spreading of the pulse width of the pulse lightwave C2 and outputs it as a pulse lightwave C3. FIG. 11C is a graph showing the pulse lightwave C3 after the pulse compression in the broadband light source unit in the fifth embodiment. In comparison with the pulse lightwave C2, the pulse lightwave C3 has pulses whose widths are narrower.

The pulse lightwave C3 is inputted into the optical fiber 30 to be guided by it. In the optical fiber 30, the wavelength bands of the individual pulses that constitute the pulse lightwave C3 and that have intensities different from one another are broadened by dint of a nonlinear optical phenomenon accompanying the guiding of the lightwave. Thus, the individual pulses become SC lightwaves having spectra different from one another. Then, the individual SC lightwaves are outputted from the optical fiber 30. When the pulse repetition period of the pulse lightwave C3 is sufficiently short, the multiple SC lightwaves are integrated in terms of time. As a result, the ripples of the spectra of the multiple SC lightwaves are mutually canceled. Thus, an SC lightwave P1 can be obtained that has a spectrum in which the ripples are mutually canceled. Consequently, the broadband light source unit 1E can increase the efficiency of producing an SC lightwave having a flat spectral form.

Sixth Embodiment

Figure 12:
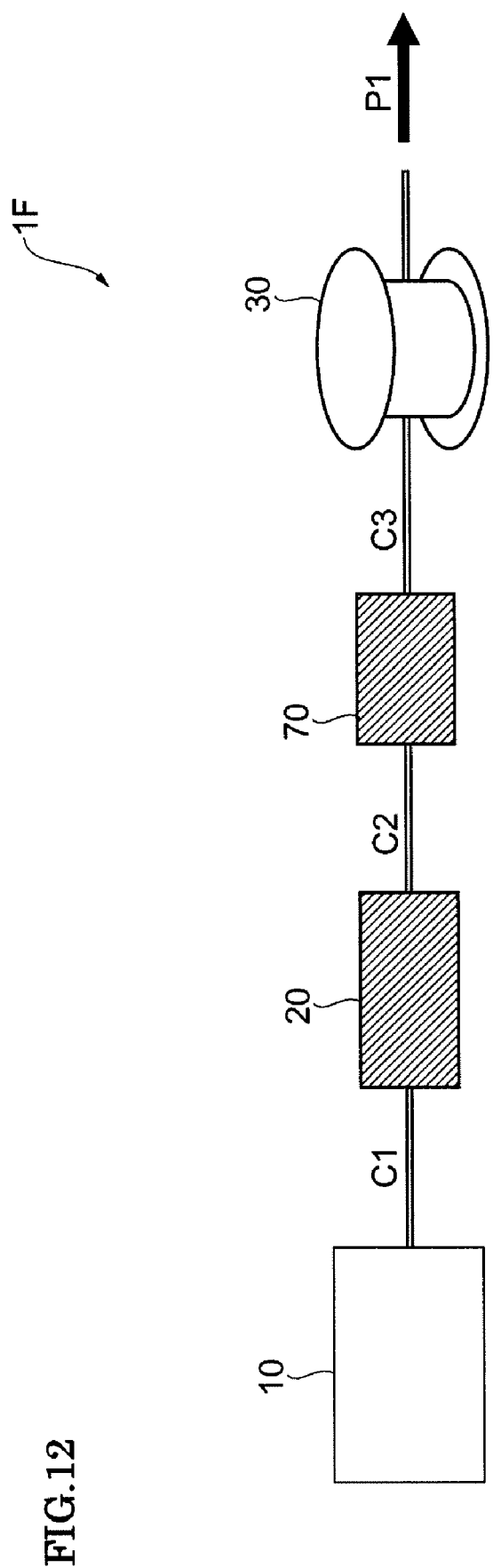
FIG. 12 is a schematic diagram showing a sixth embodiment of the broadband light source unit of the present invention.

FIG. 12 is a schematic diagram showing a broadband light source unit 1F, which is a sixth embodiment of the present invention. In comparison with the broadband light source unit 1A in the first embodiment, the broadband light source unit 1F is further provided with a polarization control section 70 between the intensity modulator 20 and the optical fiber 30. The polarization control section 70 controls the polarized state of the pulse lightwave C2 outputted from the intensity modulator 20 after its intensity is modulated.

Figure 13A:
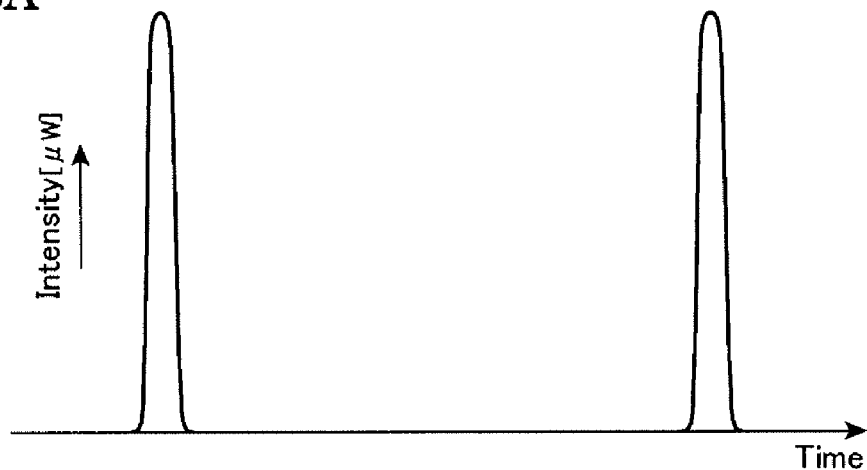
FIGS. 13A, 13B, and 13C are graphs respectively showing the pulse lightwave before entering the conversion means, the pulse lightwave after the intensity modulation, and the pulse lightwave after the changing of the polarized state in the broadband light source unit in the sixth embodiment.
Figure 13B:
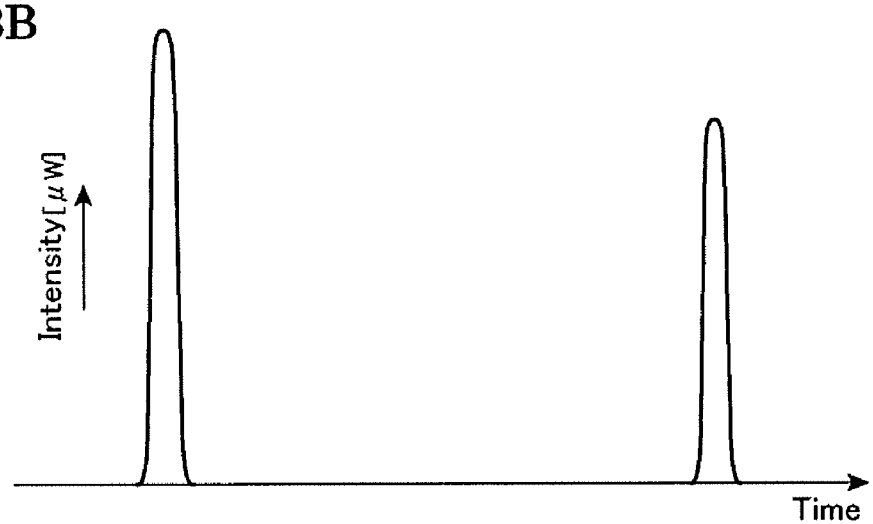

In the broadband light source unit 1F, a pulse lightwave C1 outputted from the light source 10 enters the intensity modulator 20. The intensity modulator 20 generates a pulse lightwave C2 having pulses whose intensities are different from one another and outputs the pulse lightwave C2. FIGS. 13A and 13B are graphs respectively showing the pulse lightwave C1 before entering the conversion means and the pulse lightwave C2 after the intensity modulation in the broadband light source unit in the sixth embodiment. In contrast to the pulse lightwave C1, the pulse lightwave C2 has pulses whose intensities are different from one another although whose spacings are the same.

Figure 13C:
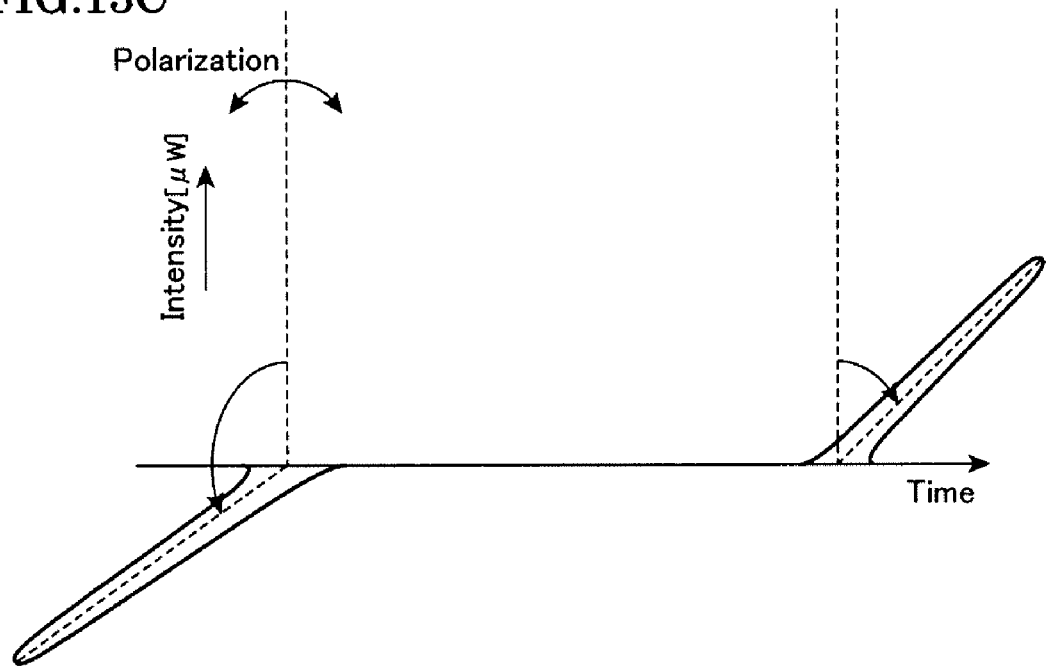

The pulse lightwave C2 enters the polarization control section 70. The polarization control section 70 changes the polarized state of the pulse lightwave C2 and outputs it as a pulse lightwave C3. FIG. 13C is a graph showing the pulse lightwave C3 after the changing of the polarized state in the broadband light source unit in the sixth embodiment. In comparison with the pulse lightwave C2, the pulse lightwave C3 has pulses whose polarized states are changed.

The pulse lightwave C3 is inputted into the optical fiber 30 to be guided by it. In the optical fiber 30, the wavelength bands of the individual pulses that constitute the pulse lightwave C3 and that have intensities different from one another are broadened by dint of a nonlinear optical phenomenon accompanying the guiding of the lightwave. Thus, the individual pulses become SC lightwaves having spectra different from one another. Then, the individual SC lightwaves are outputted from the optical fiber 30. When the pulse repetition period of the pulse lightwave C3 is sufficiently short, the multiple SC lightwaves are integrated in terms of time. As a result, the ripples (the local fluctuations) of the spectra of the multiple SC lightwaves are mutually canceled. Thus, an SC lightwave P1 can be obtained that has a spectrum in which the ripples are mutually canceled. Consequently, the broadband light source unit 1F can produce more efficiently an SC lightwave having a flat spectral form.

Embodiment of Optical Analyzer

Figure 14:
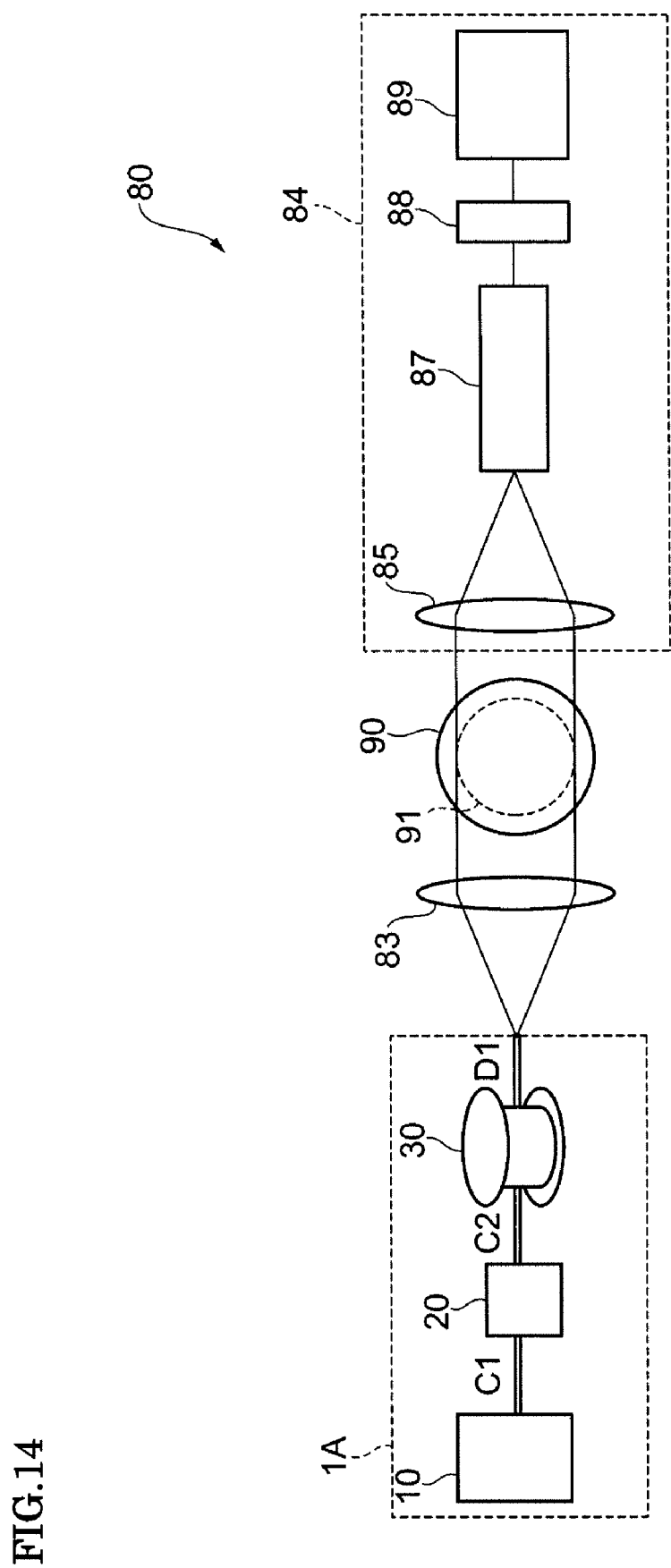
FIG. 14 is a schematic diagram showing an embodiment of the optical analyzer of the present invention.

FIG. 14 is a schematic diagram showing an optical analyzer 80 in an embodiment of the present invention. The optical analyzer 80 has a broadband light source unit 1A, a collimator lens 83, and an image pickup section 84. The collimator lens 83 transforms an SC lightwave P1 projected from the broadband light source unit 1A into a parallel lightwave and applies it to a light-receiving region 91 of a measurement-undergoing object 90. The image pickup section 84 receives a lightwave generated at the light-receiving region 91 to pick up the image of the measurement-undergoing object 90. The image pickup section 84 is provided with a lens 85, an image guide 87, a spectroscopic subsection 88, and a CCD subsection 89.

The lens 85 forms an image-forming optical subsection that receives a lightwave generated at the light-receiving region 91 to form the image at the incident end of the image guide 87. The image guide 87 is an optical guide that transfers the lightwave of the image, formed at the incident end by the lens 85, to the CCD subsection 89 with a state maintaining the two-dimensional information. The spectroscopic subsection 88 is either a variable filter or a spectroscope. The variable filter extracts the individual wavelength components of the lightwave transferred by the image guide 87. The spectroscope separates the individual wavelength components of the lightwave transferred by the image guide 87. The CCD subsection 89 is a detecting subsection that detects the spectrally analyzed lightwaves to pick up the image.

When the spectroscopic subsection 88 is composed of a variable filter, the lightwaves of the individual wavelength components extracted by the variable filter are transferred to the CCD subsection 89. The CCD subsection 89 detects individual images at the individual wavelength components to pick up the image. By varying the transmitting wavelength of the variable filter, the wavelength spectral data of the lightwave generated at the light-receiving region 91 can be obtained on a pixel-by-pixel basis. The variable filter as the spectroscopic subsection 88 may be placed at the side of the broadband light source unit 1A, for example, either at the front of or at the back of the collimator lens 83.

When the spectroscopic subsection 88 is composed of a spectroscope, the spectroscope receives, of the two-dimensional image transferred by the image guide, only one line-shaped image that has passed through a slit. The spectroscope spectrally analyzes the line-shaped image. After the spectral analysis, the CCD subsection 89 detects both the individual positions on the line having passed through the slit and the wavelengths at the individual positions to pick up the image. By changing the position of the slit or the position of the image guide, the wavelength spectral data of the lightwave generated at the light-receiving region 91 can be obtained on a pixel-by-pixel basis.

Through the above-described method using a simple system, the measurement-undergoing object 90 can be analyzed by using an SC lightwave having a flat spectral form.

Desirable embodiments of the present invention are explained above. However, the embodiments can be modified variously within the scope that does not deviate from the gist of the present invention. For example, the nonlinear optical medium may be an optical waveguide whose core has a sub-micron diameter, a silicon waveguide, a hollow-core fiber filled with a gas such as argon, an optical crystal such as sapphire, or a BK-7 glass plate. When the nonlinear optical medium is a nonlinear optical crystal, it is also desirable to constantly vary the state of the nonlinear optical crystal by varying its temperature at all times, by giving it vibrations, or by using another means. The optical analyzer 80 may use any of the broadband light source units 1A to 1F.

The present application is based on the Japanese patent application Tokugan 2007-264805 filed on Oct. 10, 2007 and incorporates its details by reference.

What is claimed is:

1. A broadband light source unit, comprising:
  (a) a light source that outputs a first source lightwave, which is a pulse lightwave having pulses that are periodic and that have a constant intensity;
  (b) a conversion means that receives the first source lightwave, produces a second source lightwave having pulses whose intensities are different from one another, and outputs the second source lightwave; and
  (c) a nonlinear optical medium section that receives the second source lightwave, produces a supercontinuum lightwave having a wavelength band broadened by dint of a nonlinear optical phenomenon, and outputs the supercontinuum lightwave.

2. The broadband light source unit as defined by claim 1, wherein the conversion means comprises an intensity modulation means that receives the first source lightwave, modulates the intensity of the first source lightwave to generate the second source lightwave, and outputs the second source lightwave.

3. The broadband light source unit as defined by claim 1, wherein the conversion means comprises:
  (a) a branching means that branches the first source lightwave into N branched lightwaves (N means the number of branched lightwaves) such that the N branched lightwaves have intensities different from one another;
  (b) a combining means that combines the N branched lightwaves and outputs a combined lightwave; and
  (c) N optical paths (N means the number of optical paths) for guiding the N branched lightwaves from the branching means to the combining means, the N optical paths having optical path lengths different from one another.

4. The broadband light source unit as defined by claim 3, wherein:
  (a) the branching means is a first optical coupler having N branches (N means the number of branches);
  (b) the combining means is a second optical coupler having N input ends (N means the number of input ends); and
  (c) the first optical coupler is optically coupled with the second optical coupler through N optical waveguides having lengths different from one another (N means the number of optical waveguides).

5. The broadband light source unit as defined by claim 1, wherein:
  (a) the conversion means is provided of:
  (a1) an optical coupler that has a first terminal, a second terminal, a third terminal, and a fourth terminal; and
  (a2) an optical waveguide that optically couples between the second and fourth terminals of the optical coupler;
  (b) the optical coupler:
  (b1) receives the first source lightwave at the first terminal, branches the first source lightwave into a first branched lightwave and a second branched lightwave, and outputs them from the second and third terminals, respectively; and
  (b2) receives the first branched lightwave, outputted from the second terminal, at the fourth terminal, further branches the first branched lightwave into a third branched lightwave and a fourth branched lightwave, and outputs them from the second and third terminals, respectively; and
  (c) the second and fourth branched lightwaves outputted from the third terminal are collectively referred to as the second source lightwave.

6. The broadband light source unit as defined by claim 1, the unit further comprising a pulse compression means that receives a lightwave outputted from the conversion means, compresses the widths of the pulses of the received lightwave, and outputs the width-compressed lightwave to the nonlinear optical medium section.

7. The broadband light source unit as defined by claim 1, the unit further comprising a polarization control means that receives a lightwave outputted from the conversion means, controls a polarized state of the received lightwave, and outputs the polarization-controlled lightwave to the nonlinear optical medium section.

8. An optical analyzer, comprising:

(a) the broadband light source unit as defined by claim 1;

(b) a light-applying section that applies a supercontinuum lightwave outputted from the broadband light source unit to a light-receiving region of a measurement-undergoing object; and (c) an image pickup section that receives a lightwave generated at the light-receiving region by the application of the supercontinuum lightwave in the light-applying section and picks up an image of the measurement-undergoing object.

\* \* \* \* \*